United States Patent [19]
Bruns et al.

[11] Patent Number: 5,310,468
[45] Date of Patent: May 10, 1994

[54] ECM SLAVE ASSEMBLY

[75] Inventors: Norbert A. Bruns; Edward C. Bruns, both of Cincinnati, Ohio

[73] Assignee: Lehr Precision Inc., Cincinnati, Ohio

[21] Appl. No.: 970,489

[22] Filed: Nov. 2, 1992

[51] Int. Cl.⁵ .............................................. B23H 9/10
[52] U.S. Cl. .................................. 204/279; 204/297 R
[58] Field of Search ......... 204/297 R, 297 W, 297 M, 204/279, DIG. 7

[56] References Cited

U.S. PATENT DOCUMENTS

| | | | |
|---|---|---|---|
| 3,461,059 | 8/1969 | Krueger | 204/297 R |
| 3,616,351 | 10/1971 | Gunther et al. | 204/224 MX |
| 3,723,268 | 3/1973 | Johns et al. | 204/129.1 |
| 4,116,799 | 9/1978 | Gosger et al. | 204/297 RX |
| 4,468,304 | 8/1984 | Hill | 204/129.6 |
| 4,663,011 | 5/1987 | Hinman | 204/224 M |
| 4,698,475 | 10/1987 | Lothenbach et al. | 204/297 RX |
| 4,752,366 | 6/1988 | Hinman | 204/224 M |
| 4,851,090 | 7/1989 | Burns et al. | 204/129.7 |
| 4,950,375 | 8/1990 | Leger | 204/224 R |
| 4,988,425 | 1/1991 | Everhart | 204/224 M |
| 4,997,534 | 3/1991 | Thornton | 204/129.1 |

FOREIGN PATENT DOCUMENTS 272759  8/1970  U.S.S.R. ................. 204/297 R

Primary Examiner—Donald R. Valentine
Attorney, Agent, or Firm—Francis L. Conte

[57] ABSTRACT

A slave assembly is provided to protect an anodic workpiece joined to a shuttle from stray electrochemical machining. The assembly includes a slave having a support flange joined integrally with a sacrificial flange positionable adjacent to the workpiece for being electrochemically machined along with the workpiece to prevent stray electrochemical machining between the sacrificial flange and the workpiece. A retainer is positionable on the slave support flange to clamp the slave to the shuttle.

13 Claims, 4 Drawing Sheets

ECM SLAVE ASSEMBLY

The present invention relates generally to electrochemical machining, and, more specifically, to preventing stray electrochemical machining of a workpiece.

BACKGROUND OF THE INVENTION

Electrochemical machining (ECM) channels an electrolyte in liquid form between a cathode tool and an anode workpiece to electrochemically erode or machine away material from the workpiece for obtaining a desired shape. The workpiece is typically mounted to a shuttle which fixedly mounts k in an ECM machine and provides a good electrical path for the high electrical currents channeled therethrough during ECM operation. The ECM machine typically also includes various electrical insulators and seals for confining flow of the electrolyte so that only the workpiece is machined and stray electrochemical machining of unintended material is prevented. Stray electrochemical machining, for example, may unintentionally damage portions of the workpiece itself rendering the workpiece unusable as a finished product.

An exemplary workpiece is a gas turbine engine stator vane having an airfoil and integral outer and inner shrouds. The shrouds, also known as platforms, provide flowpath boundaries for the motive fluid such as compressed air or combustion gases channeled over the airfoil during operating in a gas turbine engine. In order to electrochemically machine the workpiece into its final stator vane configuration, it is desirable to simultaneously electrochemically machine both the airfoil portion of the workpiece as well as at least one of the shroud portions of the workpiece with a common cathode tool.

One exemplary method and apparatus for electrochemically machining such a stator vane is disclosed in U.S. patent application Ser. No. 07/879,791, filed May 6, 1992, entitled "MultiCathode ECM Apparatus, Method, and Product Therefrom," by N. A. Bruns et al, assigned to the present assignee. In the Bruns et al ECM machine, the cathode tool is moved simultaneously towards both the airfoil and the shroud held in a workpiece shuttle for simultaneously electrochemically machining both portions in a single operation. However, the original workpiece typically is prefinished below the shroud or platform top surface and must be suitably protected from stray electrochemical machining thereof which would damage the shroud and render it unusable. Furthermore, the corners formed between the shroud top surface and its side surfaces are typically very sharp, 90° corners which are required for assembly in a complete ring in the gas turbine engine. Stray electrochemical machining of these corners which causes them to be rounded off is undesirable and can also render the part unusable.

SUMMARY OF THE INVENTION

A slave assembly is provided to protect an anodic workpiece joined to a shuttle from stray electrochemical machining. The assembly includes a slave having a support flange joined integrally with a sacrificial flange positionable adjacent to the workpiece for being electrochemically machined along with the workpiece to prevent stray electrochemical machining between the sacrificial flange and the workpiece. A retainer is positionable on the slave support flange to clamp the slave to the shuttle.

BRIEF DESCRIPTION OF THE DRAWING

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
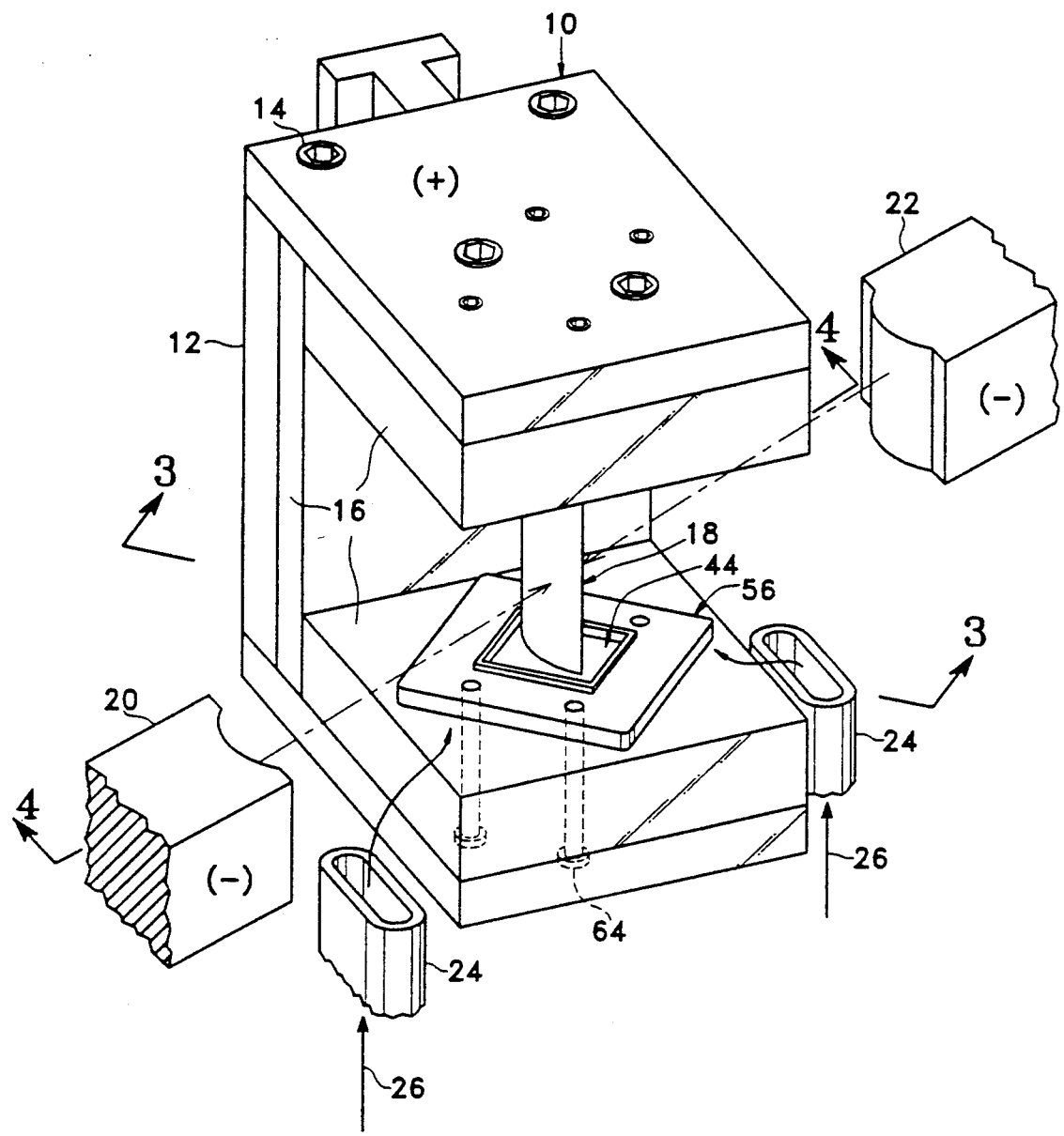
FIG. 1 is a schematic representation of an exemplary workpiece joined in a shuttle for electrochemical machining thereof by a pair of cathode tools between which an electrolyte is channeled.

Illustrated schematically in FIG. 1 is an exemplary shuttle 10 configured for mounting in an electrochemical machining (ECM) machine (not shown). The shuttle 10 includes a multipiece frame 12 joined together by suitable bolts 14 and made from a suitable, electrically conducting material such as brass so that it may be electrically joined to a suitable positive (+) voltage source. The frame 12 is generally U-shaped and includes suitable electrically nonconducting flow dams 16, which may be made from nylon for example, which are similarly configured in a U-shaped arrangement within the frame 12. The shuttle 10 is provided to support a workpiece 18 in the exemplary form of a gas turbine engine stator vane so that a pair of complementary cathode tools 20, 22 may be selectively moved toward both sides of the workpiece for the machining thereof. Suitable conduits 24 channel a conventional liquid electrolyte 26 between the cathode tools 20, 22 and the workpiece 18 for electrochemically machining the workpiece 18.

The process of electrochemical machining is conventional and various machines are available for practicing the process. The arrangement illustrated in FIG. 1 is merely exemplary of one in which a slave assembly in accordance with the present invention may be used for protecting the anodic workpiece 18 joined to the shuttle 1 0 from stray electrochemical machining as the electrolyte 26 is channeled over the workpiece 18. More specifically, and referring to FIG. 2, the workpiece 18 is in the exemplary form of a conventional gas turbine engine stator vane including an airfoil 28 extending perpendicularly outwardly from an integral first shroud or platform 30, and perpendicularly outwardly from an integral second shroud or platform 32 at its opposite end. Both shrouds 30, 32 are generally rectangular in configuration and include top or platform surfaces 34 which face the airfoil 28 to provide flowpath boundaries for the stator vane when assembled in the gas turbine engine. The shrouds 30, 32 each also include four similar side surfaces 36 which collectively define the rectangular configuration of the shrouds 30, 32.

The first and second shrouds 30, 32 are conventionally configured for being collectively supported in a ring of the stator vanes in a gas turbine engine. For example, the first shroud 30 includes a pair of laterally extending shroud support flanges 38 which extend perpendicularly outwardly from opposing side surfaces 36 and suitably below the top surface 34. The flanges 38 are provided only on two opposite sides of the first shroud 30, with the remaining two opposite sides 36 being coextensive with the edges of the flanges 38, with no additional flanges extending outwardly therefrom. The second shroud 32 is configured differently with inwardly extending shroud support flanges 40 defining a generally T-shaped slot therebetween.

The airfoil 28 of the workpiece 18 and the two top surfaces 34 are provided oversized for electrochemical machining to their final configurations. The first and second shrouds 30, 32 in this exemplary embodiment are also premachined to their final dimensions, except for the top surfaces 34 thereof. Accordingly, during electrochemical machining of the airfoil 28 and the top surfaces 34, the premachined portions of the shrouds 30, 32 must be suitably protected from stray electrochemical machining, and it is also desirable to maintain relatively sharp corners 42 on the shrouds 30, 32. The shroud top and side surfaces 34 and 36 join each other in this exemplary embodiment at 90° to define the sharp corners 42 with relatively small radii which is desired for this exemplary embodiment of the stator vane.

Figure 2:
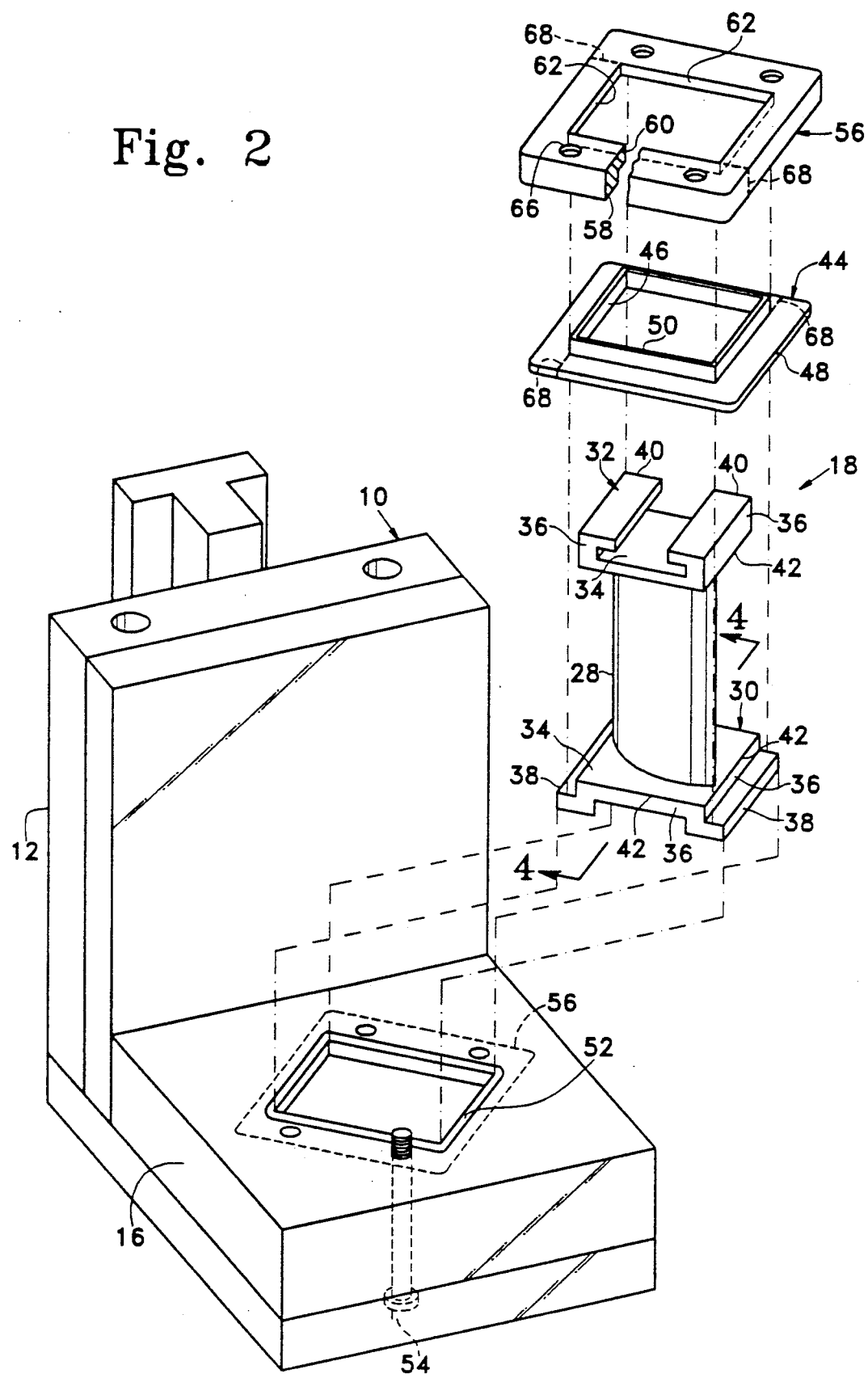
FIG. 2 is an exploded view of a portion of the shuttle illustrated in FIG. 1 showing the assembly thereto of the workpiece, a slave, and a slave retainer.

In order to protect the shrouds 30, 32 during electrochemical machining, a slave assembly in accordance with the present invention is used for each shroud 30, 32 to prevent stray electrochemical machining. In FIG. 2, one of the slave assemblies includes a one-use, disposable slave 44 having a central aperture 46 which is complementary in configuration with the first shroud 30, i.e., rectangular, for being positioned therearound to protect it from stray electrochemical machining. The slave 44 preferably includes a laterally extending annular support flange 48, which is rectangular in this exemplary configuration, joined integrally with a vertically extending sacrificial flange 50 which is also rectangular in this exemplary embodiment and defines the central aperture 46 for laterally surrounding the first shroud 30 on #s four side surfaces 36.

Figure 3:
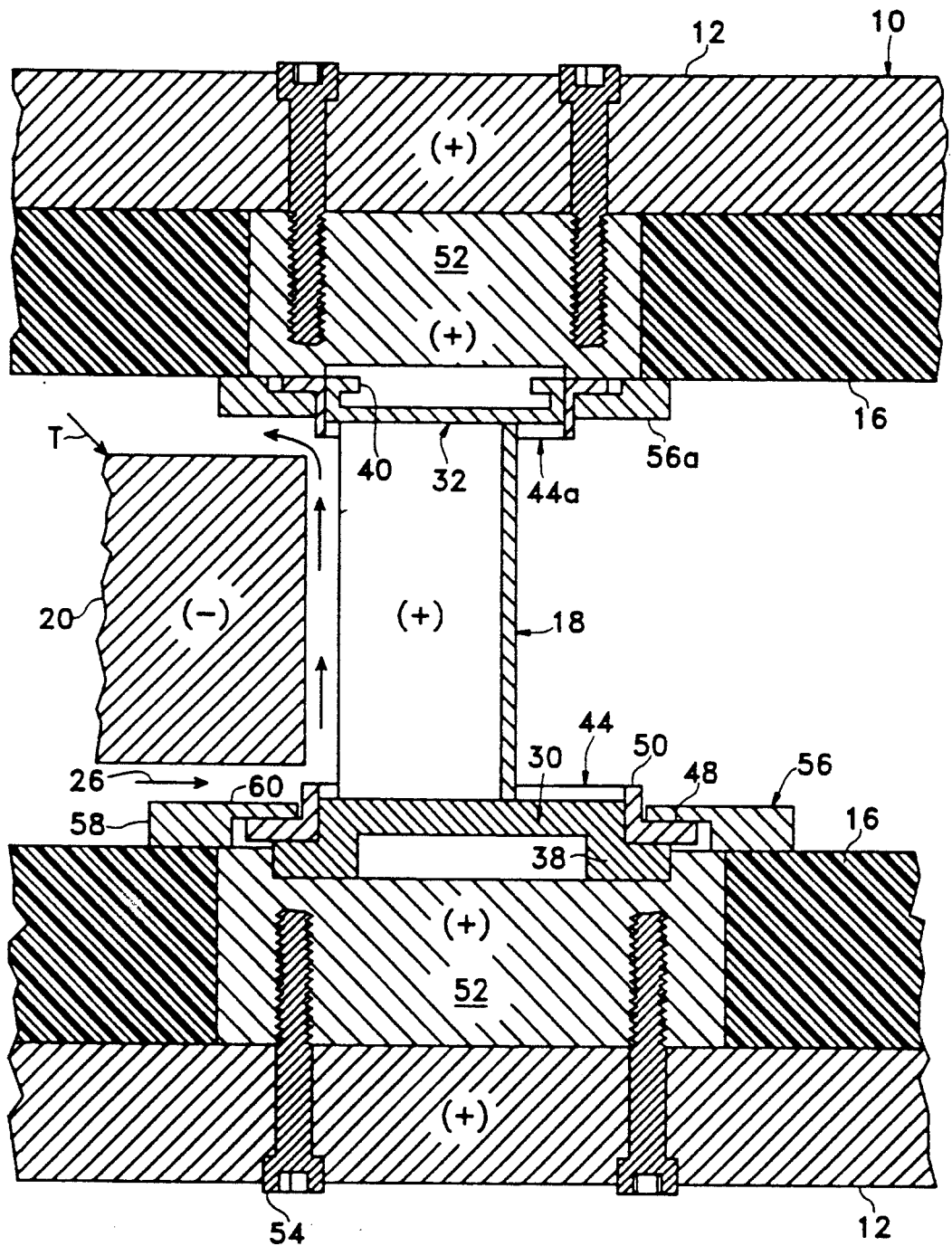
FIG. 3 is an sectional view through the assembled shuttle illustrated in FIG. 1 taken generally along line 3—3.

As shown in FIGS. 2 and 3, the shuttle 10 further includes an electrically conductive seat 52 fixedly and electrically joined to the frame 12 by suitable bolts 54 to provide an electrical current path from the frame 12 to the seat 52. In this exemplary embodiment, the seat 52 is also formed of brass. During assembly, the workpiece 18 is first positioned in the shuttle 10 by mounting the first shroud 30 into the seat 52, for example in a suitable recess therein, and then the slave 44 may be positioned downwardly over the second shroud 32 and the airfoil 28 onto the shroud support flanges 38 of the first shroud 30. The slave support flange 48 preferably extends perpendicularly from the slave sacrificial flange 50 and is configured to abut the top of the support flanges 38 of the first shroud 30 to clamp the workpiece 18 to the shuttle 10. The slave, designated 44a in FIG. 3, for the second shroud 32 is similar except that R merely surrounds the second shroud 32 since its support flanges 40 face inwardly toward each other and are not available for clamping the second shroud 32 to the shuttle 10.

In order to secure the slaves 44, 44a to the shuttle 10, a pair of similar retainers 56, 56a, respectively, are provided. These retainers are substantial identical to each other and are in the exemplary form of plates which are suitably configured for being positioned on the slave support flanges 48 to clamp the slaves 44, 44a to the shuttle 10. The slaves 44, 44a are disposable since the sacrificial flanges 50 thereof are electrochemically machined along with the respective shroud top surface 34 during machining, whereas the retainers 56, 56a are reusable since they experience less electrochemical machining or none at all depending on their construction. The slaves 44, 44a are preferably formed of a suitable material having a similar electrochemical machining rate as that of the shrouds 30, 32 and may be formed of carbon steel, for example. The retainers 56, 56a may be similarly formed of relatively inexpensive carbon steel, and may be suitably coated for protection against electrochemical machining, or may be formed of a suitable material which is resistent to electrochemical machining such as noble metals including iridium and palladium, for example.

Figure 4:
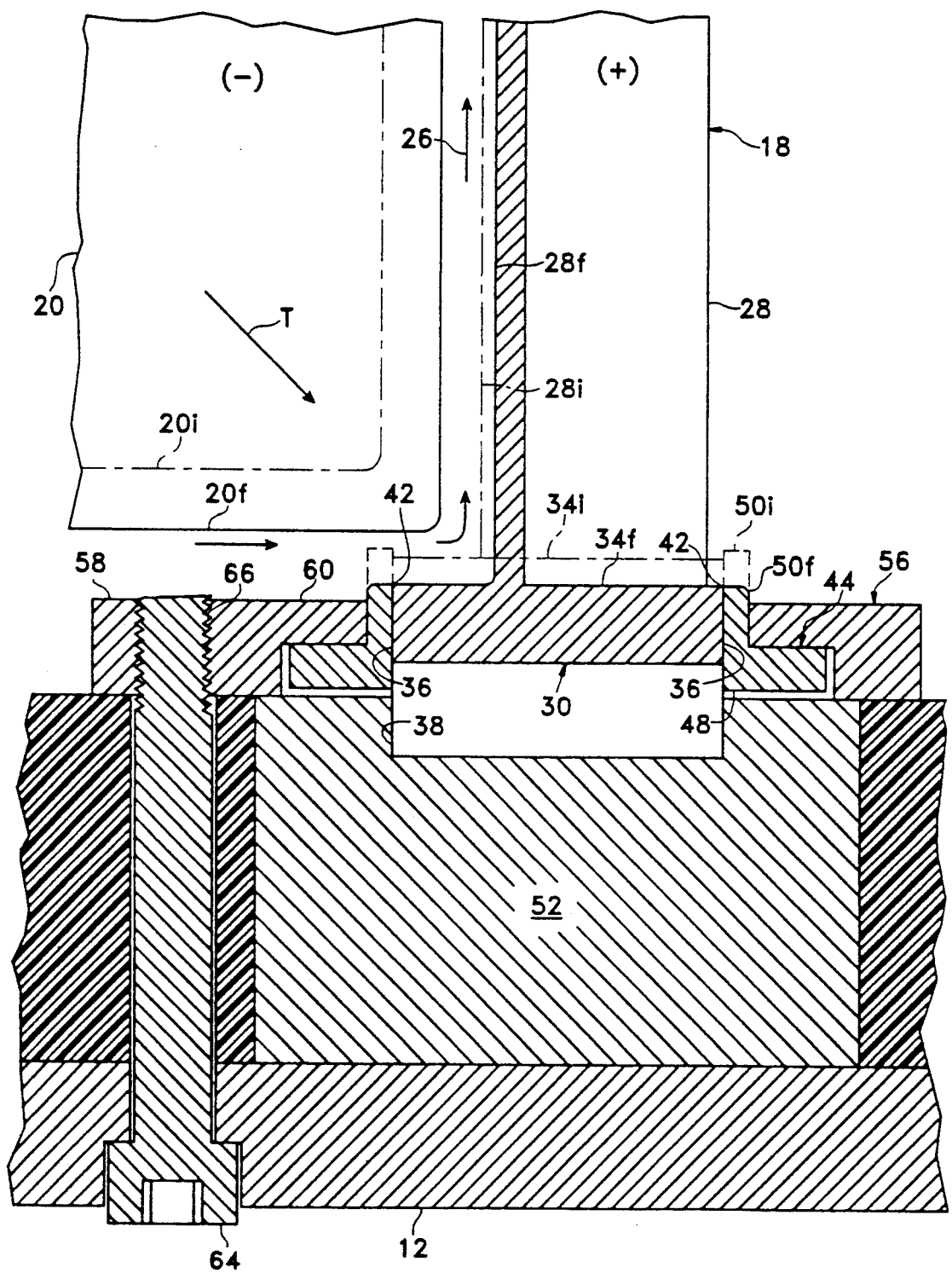
FIG. 4 is an enlarged, partly sectional view of a portion of the shuttle illustrated in FIG. 1 showing electrochemical machining of the shroud and airfoil of the workpiece as taken generally along line 4—4 therein, and additionally along line 4—4 as shown in FIG. 2.

Referring again to FIG. 2, the retainer 56 is in the exemplary form of a plate having an annular, or rectangular, laterally extending outer flange 58 joined integrally with an annular, or rectangular, laterally extending inner flange 60 defining a rectangular central aperture 62 which is complementary in configuration to the slave sacrificial flange 50 so that the retainer 56 may be positioned in turn over the second shroud 32, airfoil 28, and slave 44 with the retainer inner flange 62 abutting the top of the shroud support flange 48 adjacent to the shroud sacrificial flange 50. As shown in FIG. 3, the retainer inner flange 60 is suitably thinner than the retainer outer flange 58 to trap the slave 44 and so that the retainer outer flange 58 may abut the flow dam 16 of the shuttle 10 for being fixedly joined thereto by bolts 64 as shown in FIGS. 1, 2, and 4. As shown in more particularity in FIG. 4, the retainer 56 includes threaded apertures 66 which threadingly receive the bolts 64 which extend through the frame 12 and the flow dam 16 for securing the retainer 56 against the flow dam 16 when the bolts 64 are tightened. The retainer 56 therefore clamps the slave 44 against the shroud support flange 38 as illustrated in FIG. 3 to in turn clamp the workpiece first shroud 30 to the shuttle 10 in the seat 52.

Similarly, the second retainer 56a clamps the second slave 44a to the shuttle 12, except, however, the second slave 44a does not clamp the second shroud 32 thereto since the support flanges 40 extend toward each other and not away from each other as do the support flanges 38 of the first shroud 30.

Referring again to FIG. 4, the protection against stray electrochemical machining due to the captured slave 44 is illustrated in more particularity. The initial positions of the respective components prior to electrochemical machining are indicated by the suffixes "i" and the final positions thereof are indicated by the suffixes "f." The first cathode tool 20 is suitably moved from its initial position 20i to its final position 20f along an inclined travel vector T for simultaneously electrochemically machining both the airfoil 28 and the top surface 34 of the first shroud 30. The second cathode tool 22 (not shown in FIG. 4) is similarly moved for electrochemically machining the opposite side of the airfoil 28 and the first shroud 30. As shown in FIG. 4, the slave sacrificial flange 50 is initially about the same height (50i) as that of the top surface 34 of the first shroud 30 initially (34i). As the electrolyte 26 is channeled between the first cathode tool 20 and the workpiece 18, which are respectively maintained at negative (−) and positive (+) voltages, electrochemical machining occurs simultaneously along the top surface 34i and the airfoil 28i as the first cathode tool 20 travels along the vector T. The sacrificial flange 50 is positioned adjacent to or abuts the workpiece side surfaces 36 to prevent stray electrochemical machining thereof while both the shroud top surface 34i and the top surface of the sacrificial flange 50i are simultaneously electrochemically machined. Accordingly, the top of the sacrificial flange 50 and the shroud top surface 34 are electrochemically machined together at a similar rate of material removal until the final configuration of the airfoil 28f and of the shroud top surface 34f are reached, at which time electrochemical machining is ceased and the first cathode tool 20 is retracted.

As shown in FIG. 4, the sacrificial flange 50 protects the shroud side surfaces 36 from stray electrochemical machining, and, therefore, maintains the relatively sharp corners 42 without obtaining undesirable rounding thereof if they were not protected by the slave 44. Instead, the sacrificial flanges 50 themselves have rounded outer corners. The slave 44 also protects the remainder of the first shroud 30 below the top surface 34 since ft provides a barrier to the flow of the electrolyte 26 thereover, with the retainer 56 effectively sealing the slave 44 to the flow dam 16 to prevent undesirable electrolyte flow over the first shroud 30.

As shown in FIGS. 3 and 4, the slave assembly including the retainer 56 and the slave 44, is effective for clamping the first shroud 30 directly to the seat 52 which ensures a good electrical path therebetween for carrying the substantial amount of current to the workpiece 18 as required for obtaining effective electrochemical machining thereof. Although the second slave 44a at the top of the workpiece 18 illustrated in FIG. 3 does not clamp the second shroud 32 to its respective seat 52 in the shuttle 10, it nevertheless suitably protects the second shroud 32 from stray electrochemical machining for also maintaining the sharp, 90° corners 42 therein without rounding thereof due to stray electrochemical machining.

Accordingly, the slave assembly disclosed above provides effective protection against stray electrochemical machining where not desired by using a disposable slave 44 retained by a reusable retainer 56. This reduces the cost of machining the workpieces 18 in mass production. The slave 44 may be additionally used to clamp the workpiece 18 to the shuttle 10 if desired, such as clamping the first shroud 30 thereto as described above. Of course, the slave 44 is configured for each particular configuration of the workpiece 18 such as the first and second shrouds 30, 32, with the retainer 56 being suitably configured for capturing and clamping the slave 44 to the shuttle 10.

As shown in FIG. 2, both the slave 44 and the retainer 56 are preferably annular structures, e.g. rectangular, having central apertures 46, 62 which in turn nest over the shrouds 30, 32. In this form, the slave 44 and the retainer 56 may be suitably and economically formed as stamped sheet metal plates, with the apertures 46, 62 being simply punched therethrough.

The slave 44 and the retainer 56 may take other suitable forms including multi-piece components which may be assembled together for providing suitable protection of workpieces. For example, the slave 44 and the retainer 56 illustrated in FIG. 2 could each be a two-part component suitably severed apart along joints 68 shown in phantom which would, therefore, allow their assembly together from opposite sides of the workpiece 18 instead of requiring that they be assembled downwardly over the workpiece 18 as shown in FIG. 2.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

1. A slave assembly for protecting an anodic workpiece joined to a shuttle from stray electrochemical machining as an electrolyte is channeled over said workpiece comprising:
   a slave including a support flange joined integrally with a sacrificial flange for being positioned adjacent to said workpiece for being electrochemically machined along with said workpiece to prevent stray electrochemical machining between said sacrificial flange and said workpiece; and
   a retainer configured for being positioned on said slave support flange to clamp said sleeve to said shuttle.

2. A slave assembly according to claim 1 wherein said workpiece includes a top surface to be electrochemically machined and a side surface to be protected from stray electrochemical machining, and said slave sacrificial flange is configured to be positioned adjacent to said workpiece side surface so that both said workpiece top surface and a top surface of said sacrificial flange are simultaneously electrochemically machined.

3. A slave assembly according to claim 2 wherein said workpiece further includes a flange extending perpendicularly from said workpiece side surface and below said workpiece top surface, and said slave support flange extends perpendicularly from said slave sacrificial flange and is configured for abutting said workpiece flange so that said retainer clamps said slave against said workpiece flange to clamp said workpiece to said shuttle.

4. A slave assembly according to claim 3 wherein:
   said workpiece includes an airfoil extending outwardly from an integral shroud;
   said shroud is rectangular and includes said workpiece top surface facing said airfoil, and four of said workpiece side surfaces define said rectangular shroud; and
   said slave includes a central aperture defined by said slave sacrificial flange and is complementary to said shroud for laterally surrounding said shroud on said shroud four side surfaces.

5. A slave assembly according to claim 4 wherein said retainer is in the form of a plate having an annular outer flange joined integrally with an annular inner flange defining a central rectangular aperture being complementary to said sleeve sacrificial flange, said retainer inner flange being configured for abutting said slave support flange adjacent to said slave sacrificial flange, and said retainer outer flange being configured for abutting said shuttle for being fixedly joined thereto.

6. A slave assembly according to claim 5 wherein each of said slave and said retainer is a one-piece plate.

7. A slave assembly according to claim 6 in combination with said shuttle, said shuttle including an electrically conducting seat for receiving said workpiece shroud, said slave being adapted to be disposed around said shroud with said slave support flange being disposable on said shroud support flange, and said retainer being disposed around said slave with said retainer inner flange being disposed on said slave support flange, and said retainer outer flange being fixedly joined to said shuttle for clamping said retainer to said slave, and in turn clamping said slave to said shroud and said shroud to said shuttle seat for providing an electrical path from said seat to said shroud.

8. A slave assembly according to claim 7 wherein said shroud top and side surfaces join each other at a 90° corner, and said slave sacrificial flange is adapted to be positioned adjacent to said shroud side surfaces so that electrochemical machining of both said sacrificial flange and said shroud top surface maintain said 90° corner without rounding thereof due to stray electrochemical machining.

9. A slave for protecting an anodic workpiece joined to a shuttle from stray electrochemical machining as electrolyte is channeled over said workpiece comprising a support flange joined integrally with a sacrificial flange for being positioned adjacent to said workpiece for being electrochemically machined along with said workpiece to prevent stray electrochemical machining between said sacrificial flange and said workpiece.

10. A slave according to claim 9 wherein said workpiece includes a top surface to be electrochemically machined and a side surface to be protected from stray electrochemical machining, and said slave sacrificial flange is configured to be positioned adjacent to said workpiece side surface so that both said workpiece top surface and a top surface of said sacrificial flange are simultaneously electrochemically machined.

11. A slave according to claim 10 wherein said workpiece further includes a flange extending perpendicularly from said workpiece side surface and below said workpiece top surface, and said slave support flange extends perpendicularly from said slave sacrificial flange and is configured for abutting said workpiece flange so that said retainer clamps said slave against said workpiece flange to clamp said workpiece to said shuttle.

12. A slave according to claim 11 wherein:
said workpiece includes an airfoil extending outwardly from an integral shroud;
said shroud is rectangular and includes said workpiece top surface facing said airfoil, and four of said workpiece side surfaces define said rectangular shroud; and
said slave includes a central aperture defined by said slave sacrificial flange and is complementary to said shroud for laterally surrounding said shroud on said shroud four side surfaces.

13. A slave according to claim 12 in the form of a one-piece plate.

* * * * *